(12) United States Patent
Xu et al.

(10) Patent No.: US 11,724,647 B2
(45) Date of Patent: Aug. 15, 2023

(54) ROTARY IMAGING DEVICE FOR WHEELS AND AUTOMOBILE

(71) Applicant: CITIC Dicastal CO., LTD., Hebei (CN)

(72) Inventors: Shiwen Xu, Qinhuangdao (CN); Minglei Li, Qinhuangdao (CN); Yao Dai, Qinhuangdao (CN); Shaoqian Wang, Qinhuangdao (CN); Weidong Liu, Qinhuangdao (CN); Xi Li, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 60 days.

(21) Appl. No.: 17/209,584

(22) Filed: Mar. 23, 2021

(65) Prior Publication Data
US 2021/0309151 A1 Oct. 7, 2021

(30) Foreign Application Priority Data
Apr. 3, 2020 (CN) .......................... 202010260756.5

(51) Int. Cl.
*H04N 7/18* (2006.01)
*B60R 1/00* (2022.01)
(Continued)

(52) U.S. Cl.
CPC .............. *B60R 1/002* (2013.01); *H04N 23/51* (2023.01); *H04N 23/632* (2023.01); *H04N 23/65* (2023.01)

(58) Field of Classification Search
CPC ...... G06V 20/58; G06V 20/584; G06V 20/64; G06V 20/56; G06V 10/768; G06V 20/10;
(Continued)

(56) References Cited

U.S. PATENT DOCUMENTS

| | | | |
|---|---|---|---|
| 2004/0130905 A1* | 7/2004 | Olds | B60Q 1/326 362/500 |
| 2005/0134475 A1* | 6/2005 | Reim | B60Q 1/32 340/815.45 |

(Continued)

FOREIGN PATENT DOCUMENTS

| | | | |
|---|---|---|---|
| CN | 210582879 U | * | 5/2020 |
| JP | 3044689 U | | 1/1998 |

(Continued)

*Primary Examiner* — Masum Billah
(74) *Attorney, Agent, or Firm* — Cooper Legal Group, LLC

(57) ABSTRACT

A rotary imaging device for wheels and an automobile are disclosed. The rotary imaging device for wheels includes a housing matched with the wheels, and a processing component, a display component and a power supply that are installed in the housing, the processing component being electrically connected with the display component and the processing component and the display component being both electrically connected with the power supply. The processing component is configured to send received or read to-be-displayed content to the display component after preset processing, and the display component is configured to display the to-be-displayed content sent by the processing component. According to the rotary imaging device for wheels and the automobile, images or videos can be formed through rotation of the wheels.

8 Claims, 3 Drawing Sheets

(51) Int. Cl.
*H04N 23/51* (2023.01)
*H04N 23/65* (2023.01)
*H04N 23/63* (2023.01)

(58) Field of Classification Search
CPC .... G06V 20/54; G06V 2201/08; G06V 40/20; G06T 2207/20064; G06T 2207/30256; B60K 35/00; B60K 2370/143; B60K 2370/1438; B60K 37/06; B60K 2370/797; B60K 2370/1434; B60K 2370/1537; B60K 2370/332
USPC .......................................................... 348/148
See application file for complete search history.

(56) References Cited

U.S. PATENT DOCUMENTS

2006/0038831 A1\* 2/2006 Gilbert ................... G09G 3/005
  345/619
2020/0099843 A1\* 3/2020 Kanayama ........... G01N 21/359

FOREIGN PATENT DOCUMENTS

| JP | H10307549 | A |   | 11/1998 |
|----|-----------|---|---|---------|
| JP | H11133903 | A |   | 5/1999  |
| JP | 2000168651 | A |   | 6/2000  |
| JP | 2001180553 | A |   | 7/2001  |
| JP | 2005227752 | A |   | 8/2005  |
| JP | 2011013436 | A | \* | 1/2011  |
| JP | 2011013436 | A |   | 1/2011  |
| KR | 101103562 | B1 |   | 1/2012  |
| KR | 20150012021 | A |   | 2/2015  |
| KR | 101685611 | B1 |   | 12/2016 |

\* cited by examiner

ROTARY IMAGING DEVICE FOR WHEELS AND AUTOMOBILE

CROSS-REFERENCE TO RELATED APPLICATIONS

The present application claims benefit of Chinese Application No. 202010260756.5, filed on Apr. 3, 2020, the disclosure of which is hereby incorporated by reference in its entirety.

BACKGROUND

With development of economy, automobiles are becoming more and more popular. In addition to basic functions of the automobiles, users hope that the automobiles will have more functions.

SUMMARY

The present disclosure relates to the field of automobiles, and in particular to a rotary imaging device for wheels and an automobile.

In view of this, it is desirable that embodiments of the present disclosure provide a rotary imaging device for wheels and an automobile so as to realize more functions of the automobile.

In order to achieve the above objective, the technical solution of the embodiments of the present disclosure is implemented as follows.

According to a first aspect, the embodiments of the present disclosure provide a rotary imaging device for wheels. The device includes a housing matched with the wheels, and a processing component, a display component and a power supply that are installed in the housing, the processing component being electrically connected with the display component, and the processing component and the display component being both electrically connected with the power supply. The processing component is configured to send received or read to-be-displayed content to the display component after preset processing; and the display component is configured to display the to-be-displayed content sent by the processing component.

In the above solution, the housing includes an inner housing of which the inner side is fixed to spokes of the wheels, and an accommodating cavity for placing the processing component and the display component is arranged in the middle of the inner housing.

In the above solution, the device further includes an outer cover plate covering the inner housing, and the part, corresponding to the accommodating cavity, of the outer cover plate is where a preset material or a preset structure of the display component can be seen.

In the above solution, the power supply is a rechargeable storage battery.

In the above solution, the power supply is a generator that generates power when the wheels rotate.

In the above solution, the power supply includes a rechargeable storage battery and a generator. An input end of the storage battery is connected with the generator, and an output end of the storage battery is connected with the processing component and the display component.

In the above solution, the power supply includes a generator, a rechargeable storage battery, and a power management component, an output end of the generator and an output end of the storage battery being both connected with the processing component and the display component. When the generator is working, the power management component controls the output end of the generator to output power; otherwise, the power management component controls the output end of the storage battery to output power.

According to a second aspect, the embodiments of the present disclosure provide an automobile that includes wheels and a rotary imaging device installed on the wheels. The rotary imaging device is a rotary imaging device for wheels. The device includes a housing matched with the wheels, and a processing component, a display component and a power supply that are installed in the housing, the processing component being electrically connected with the display component, and the processing component and the display component being both electrically connected with the power supply. The processing component is configured to send received or read to-be-displayed content to the display component after preset processing; and the display component is configured to display the to-be-displayed content In the above solution, the automobile further includes a vehicle speed detection device electrically connected with the rotary imaging device.

In the above solution, the automobile further includes a brightness detection device electrically connected with the rotary imaging device.

According to the rotary imaging device for wheels and the automobile provided by the embodiments of the present disclosure, the rotary imaging device for wheels includes the housing matched with the wheels, and the processing component, the display component and the power supply installed in the housing, the processing component being electrically connected with the display component and the processing component and the display component being both electrically connected with the power supply. As can be seen, according to the rotary imaging device for wheels and the automobile provided by the embodiments of the present disclosure, the processing component and the display component may be installed on the wheels, and images or videos may be formed through rotation of the wheels, thereby realizing more functions of the automobile.

Other beneficial effects of the embodiments of the present disclosure will be further described in specific implementation modes in conjunction with specific technical solutions.

BRIEF DESCRIPTION OF THE DRAWINGS

In order to describe technical solutions in the embodiments of the present disclosure more clearly, the drawings to be used in the descriptions of the embodiments will be described below. It should be understood that the drawings described below are only a part of the drawings of the embodiments of the present disclosure. For those of ordinary skill in the art, other drawings may be obtained based on these drawings without creative labor.

DETAILED DESCRIPTION

Figure 1:
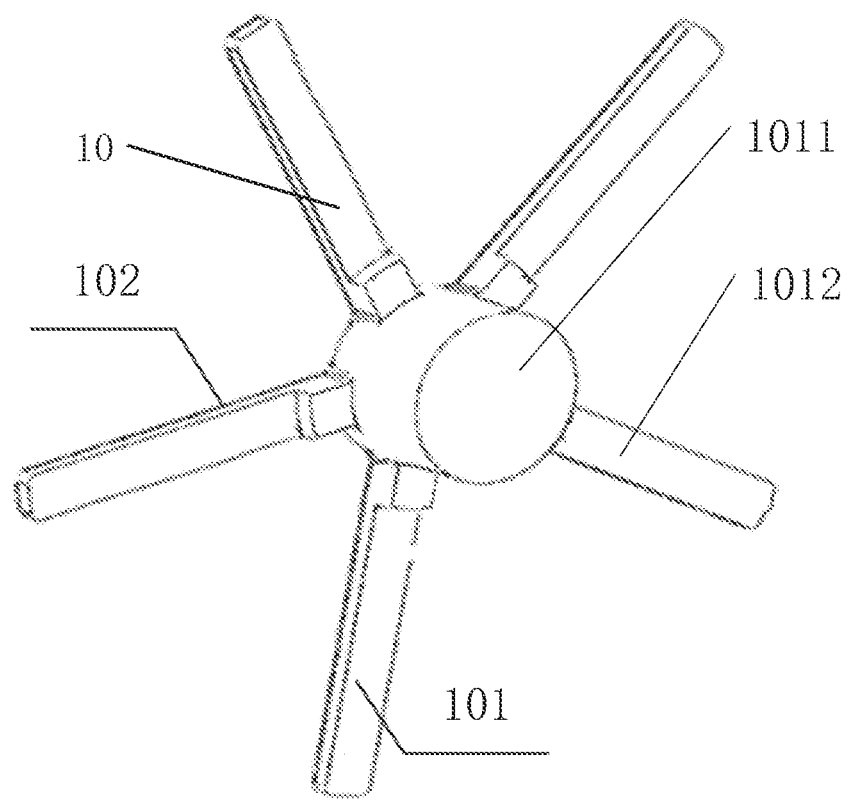
FIG. 1 is a schematic diagram of a housing in a rotary imaging device for wheels provided by an embodiment of the present disclosure.

An embodiment of the present disclosure provides a rotary imaging device for wheels, the device includes a housing matched with the wheels, and a processing component, a display component and a power supply that are installed in the housing. The processing component may be electrically connected with the display component and the processing component and the display component may be both electrically connected with the power supply.

The processing component is configured to send received or read to-be-displayed content to the display component after preset processing.

The display component is configured to display the to-be-displayed content sent by the processing component.

The principle of the rotary imaging device in the embodiment of the present disclosure is visual residue. In other words, multiple divided pictures or videos form a complete picture or video under the rotation of the wheels.

The to-be-displayed content herein may be a picture or a video.

The preset processing herein may be adjusting the number of frames displayed according to a vehicle speed.

According to the rotary imaging device for wheels and the automobile provided by the embodiments of the present disclosure, a processing component and a display component may be installed on the wheels, and images or videos may be formed through the rotation of the wheels, thereby realizing more functions of the automobile.

In some other embodiments of the present disclosure, the housing includes an inner housing of which the inner side is fixed to spokes of the wheels, and an accommodating cavity for placing the processing component and the display component is arranged in the middle of the inner housing. In this way, it is convenient for the rotary imaging device to be better fixed to the wheels of the automobile, which is a preferred implementation mode.

In some other embodiments of the present disclosure, the device further includes an outer cover plate covering the inner housing, and the part, corresponding to the accommodating cavity, of the outer cover plate is where a preset material or a preset structure of the display component can be seen. The preset material herein may be a transparent material, and the preset structure herein may be a hollow structure and the like, which not only can protect the processing component and the display component, but also enables the content displayed on the display component to be seen from the outside, and is thus a preferred implementation mode.

In some other embodiments of the present disclosure, the power supply is a rechargeable storage battery. In this way, the structure is simple and the performance is stable, which is a preferred implementation mode. Of course, the device in the embodiment of the present disclosure may also be powered by the power supply of the automobile itself. In other words, the device does not have an independent power supply, and is connected to the power supply of the automobile only via one conductive wire.

In some other embodiments of the present disclosure, the power supply is a generator that generates power when the wheels rotate. In this way, an external power source is not needed for charging, which is a preferred implementation mode.

In some other embodiments of the present disclosure, the power supply includes a rechargeable storage battery and a generator, an input end of the storage battery may be connected with the generator, and an output end of the storage battery may be connected with the processing component and the display component. This is one way to combine the above two implementation modes, which can not only exert stability of supplying power by the storage battery, but also has no need for charging through an external power supply.

In some other embodiments of the present disclosure, the power supply includes a generator, a rechargeable storage battery and a power management component. An output end of the generator and an output end of the storage battery may be both connected with the processing component and the display component. When the generator is working, the power management component controls the output end of the generator to output power; otherwise, the power management component controls the output end of the storage battery to output power. This is another way to combine the above two implementation modes, so that the storage battery is only used when the generator is not working, which can maximize the service life of the storage battery and is a preferred implementation mode.

An embodiment of the present disclosure further provides an automobile that includes wheels and a rotary imaging device mounted on the wheels. The rotary imaging device is any one of the above rotary imaging devices for wheels.

In some other embodiments of the present disclosure, the automobile further includes a vehicle speed detection device electrically connected with the rotary imaging device. Since the principle of the rotary imaging device of the embodiments of the present disclosure is visual residue, visual residue cannot be formed if the vehicle speed is too slow, and the processing speed of the processing component cannot keep up if the vehicle speed is too fast. Therefore, only within a preset vehicle speed range, can the rotary imaging device work. The rotary imaging device also needs to adjust the number of frames of images displayed according to the vehicle speed to achieve better image display effects.

In some other embodiments of the present disclosure, the automobile further includes a brightness detection device electrically connected with the rotary imaging device. When light is too bright, the display effect of the rotary imaging device of the embodiments of the present disclosure will be influenced. Thus, generally the rotary imaging device does not work on sunny days, and works only on cloudy days or at night.

In order to understand the present disclosure more clearly, the present disclosure will be further depicted in detail with reference to the accompanying drawings and specific embodiments. It should be understood that the specific embodiments described herein are only used to illustrate the present disclosure rather than limit the present disclosure. In addition, the embodiments described below are only part of the embodiments of the present disclosure rather than all of the embodiments. All the other embodiments that those of ordinary skill in the art could obtain based on these embodiments without making creative labor fall within the protection scope of the present disclosure.

First Embodiment

Figure 2:
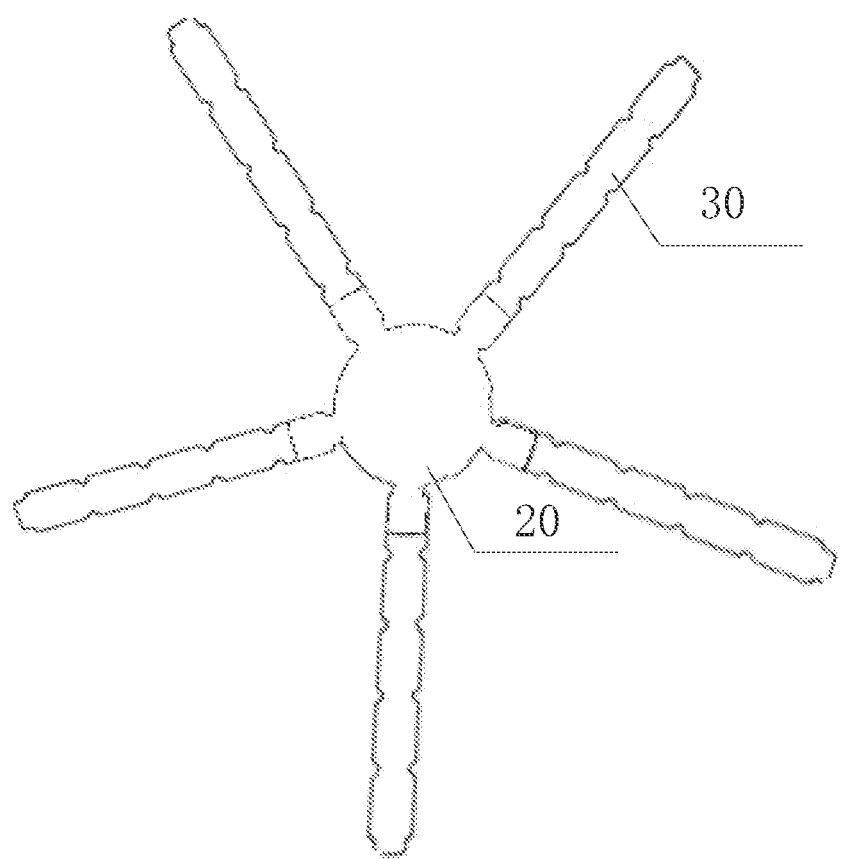
FIG. 2 is a schematic diagram of a processing component and a display component in a rotary imaging device for wheels provided by an embodiment of the present disclosure.
Figure 3:
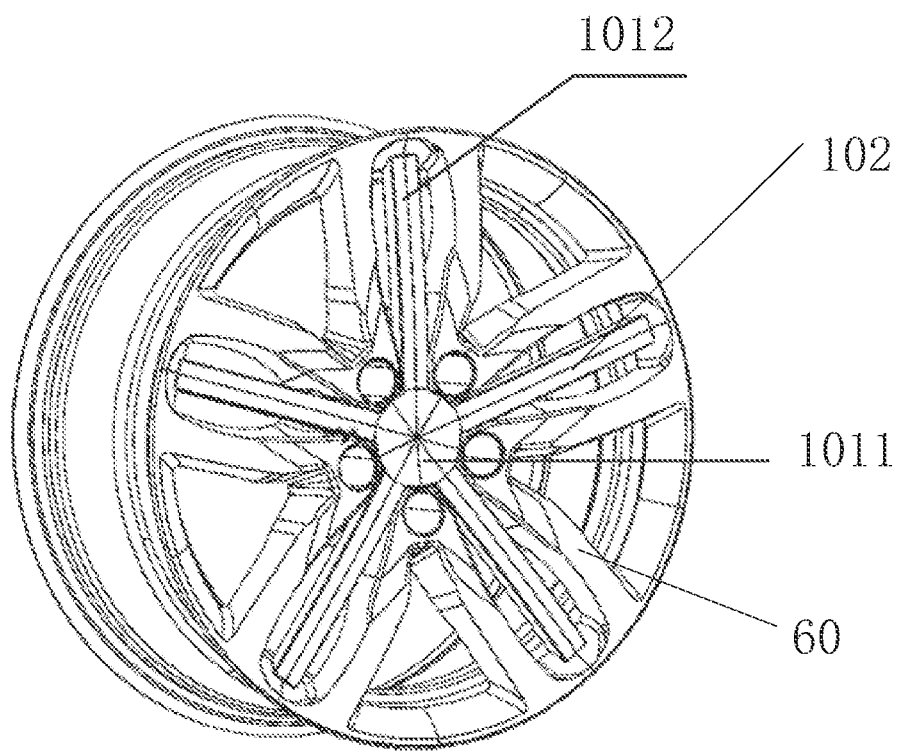
FIG. 3 is a schematic diagram of a rotary imaging device for wheels installed on the wheels provided by an embodiment of the present disclosure.

As shown in FIGS. 1-3, the present embodiment provides a rotary imaging device for wheels, and the device includes a housing 10, a processing component 20, a display component 30, and a power supply (not shown in the figures).

The housing 10 is matched with the wheels, and the processing component 20, the display component 30 and the power supply are all installed in the housing 10. The processing component 20 may be electrically connected with the display component 30, and the processing component 20 and the display component 30 may be electrically connected with the power supply.

The processing component 20 is configured to send received or read to-be-displayed content to the display component 30 after preset processing; and the display component 30 is configured to display the to-be-displayed content sent by the processing component.

The processing component 20 may either receive the to-be-displayed content in the cloud through a wireless receiver (not shown in the figures), or read the to-be-displayed content in a local storage component.

The received to-be-displayed content in the cloud may be preset processed in the cloud or locally. The read to-be-displayed content in the local storage component may be preset processed locally.

Specifically, the processing component 20 may be a single chip microcomputer or a similar intelligent control component. More specifically, the processing component 20 may be a microcontroller unit (MCU).

MCU is also called a single chip microcomputer, which appropriately reduces frequency and specifications of a central process unit (CPU) and integrates a memory, a timer, a universal serial bus (USB), A/D (analog/digital) conversion, a universal asynchronous receiver/transmitter (UART), a programmable logic controller (PLC), a direct memory access (DMA) and peripheral interfaces, and even an LCD drive circuit on a single chip to form a chip-level computer. Different combinations of control may be made for different applications, such as control of mobile phones, PC peripherals, remote controllers, automobile electronics, industrial stepping motors, robotic arms and the like.

Specifically, the display component 30 may be a light strip board. The light strip board may be a board card provided with an LED light strip.

Specifically, the wireless receiver may perform reception through a public mobile communication network. The public mobile communication network may include second-generation (2G) global system for mobile communication (GSM)/code division multiple access (CDMA), time division-synchronous code division multiple access (TD-SCDMA)/code division multiple access 2000 (CDMA2000)/wideband code division multiple access (WCDMA) of third-generation (3G) mobile communication and time division long term evolution (TD-LTE)/frequency division duplexing long term evolution (FDD-LTE) of fourth-generation (4G) mobile communication, 5th generation (5G) mobile networks and the like, but is not limited to this, and may also be other networks that can realize communication. In order to ensure speed and stability, adopting 4G or 5G is a preferred implementation mode.

The housing 10 includes an inner housing 101 of which the inner side is fixed to spokes 60 of the wheels, and an accommodating cavity for placing the processing component 20 and the display component 30 is arranged in the middle of the inner housing 101. Specifically, the accommodating cavity includes a first accommodating cavity 1011 for accommodating the processing component 20 and the power supply and a second accommodating cavity 1012 for accommodating the display component 30, the first accommodating cavity 1011 is located in the middle, the second accommodating cavity 1012 is located at the periphery of the first accommodating cavity 1011, and the second accommodating cavity 1012 is matched with the spokes of the wheels, and there is a plurality of strip cavities radiated.

The device further includes an outer cover plate 102 covering the inner housing 101, and the outer cover plate 102 is made of a transparent material. In this way, the content displayed by the display component 30 can be seen from the outside, and the processing component 20, the display component 30 and the power supply may be protected as well.

The power supply is connected to a power supply system of the automobile. In other words, there is no power supply in the accommodating cavity, and there is only one conductive wire connected to the power supply system of the automobile.

Second Embodiment

This embodiment is the same as the first embodiment except for the power supply. The power supply of this embodiment is a rechargeable storage battery. Specifically, the storage battery is a battery pack composed of multiple lithium batteries.

Third Embodiment

This embodiment is the same as the first embodiment except for the power supply. The power supply of this embodiment is a generator that generates power when the wheels rotate. Specifically, the generator is a disc-type generator with an iron core. The principle of the generator is that a rotor rotates along with the wheels, a stator remains stationary under the action of gravity, and a relative movement of the stator and the rotor causes a conductor to cut magnetic lines of force to generate power. More specifically, the stator includes a high-density counterweight and is provided with a permanent magnet on an inner wall thereof, an outer circumference of the rotor includes the iron core and coils, the iron core is made of a high-quality Hipersil sheet, and the coils are made of high-quality copper conductive wires.

Fourth Embodiment

This embodiment is the same as the first embodiment except for the power supply. The power supply of this embodiment includes a rechargeable storage battery and a generator. An input end of the storage battery may be connected with the generator, and an output end of the storage battery may be connected with the processing component 20 and the display component 30. In other words, the power generated by the generator is only supplied for charging the storage battery and is not directly supplied to the processing component 20 and the display component 30, because the power directly output by the generator is not stable enough and the processing component 20 and the display component 30 are powered by the storage battery.

The generator of this embodiment is a disc-type coreless generator, that is, the generator in the fourth embodiment 4 is the same as that in the third embodiment except for the rotor. The rotor of this embodiment is a coreless rotor. The generator has a light weight, a low power consumption, and a high efficiency.

Fifth Embodiment

This embodiment is the same as the first embodiment except for the power supply. The power supply of this embodiment includes a generator, a rechargeable storage battery and a power management component. An output end of the generator and an output end of the storage battery may be both connected with the processing component 20 and the display component 30. When the generator is working, the power management component controls the output end of the generator to output power; otherwise, the power management component controls the output end of the storage battery to output power. That is, the storage battery in this embodiment is only used as a backup power supply device and is used in the event of a generator failure or other emergency situations, and usually it is the generator that always supplies power. The generator of this embodiment may be the disc-type generator with the iron core of the third embodiment, or the disc-type coreless generator of the fourth embodiment.

Sixth Embodiment

This embodiment provides an automobile that includes wheels and a rotary imaging device installed on the wheels. The rotary imaging device is any one of the rotary imaging devices for wheels depicted in the first embodiment to the fifth embodiment.

The automobile further includes a vehicle speed detection device electrically connected with the rotary imaging device. That is, the rotary imaging device of this embodiment needs to determine whether to work according to the vehicle speed, and adjust the number of frames of images displayed according to the vehicle speed. Specifically, the vehicle speed detection device may be a speed sensor.

The automobile further includes a brightness detection device electrically connected with the rotary imaging device. That is, the rotary imaging device needs to determine whether to work according to brightness of light, and can adjust brightness and contrast displayed according to the brightness of the light. Specifically, the brightness detection device may be a light sensor.

In descriptions of the embodiments of the present disclosure, unless otherwise specified and defined, the term "connection" should be interpreted broadly. For example, it may be electrical connection or internal communication between two components, and it may be direct connection or indirect connection through an intermediate medium. Those of ordinary skill in the art may understand the specific meaning of the above terms as required.

In the embodiments of the present disclosure, the terms "first\second\third" involved are only used to distinguish similar objects, and do not represent a specific order of objects. Understandably, the specific order or sequence of the terms "first\second\third", if allowed, may be interchanged.

It should be understood that the term "an/one embodiment" or "some embodiments" mentioned throughout the description means that specific features, structures, or characteristics related to the embodiments are included in at least one embodiment of the present disclosure. Therefore, the term "in an/one embodiment" or "in some embodiments" that appears in various places throughout the description does not necessarily refer to the same embodiment(s). In addition, these specific features, structures or characteristics may be combined in one or more embodiments in any suitable manner. It should be understood that, in various embodiments of the present disclosure, the serial numbers of the above processes do not mean the sequence of execution thereof, the sequence of execution of the processes should be determined by functions and internal logic thereof and should not constitute any limitation upon the implementation process of the embodiments of the present disclosure. The serial numbers of the embodiments of the present disclosure only serve the purpose of illustrations rather than represent advantages and disadvantages of the embodiments.

In summary, the above embodiments are only preferred embodiments of the present disclosure and are not intended to limit the protection scope of the present disclosure. Any modifications, equivalent substitutions, improvements and the like made within the spirits and principles of the present disclosure shall fall into the protection scope of the present disclosure.

The invention claimed is:

1. An automobile comprising wheels and a rotary imaging device installed on the wheels, wherein the rotary imaging device is a rotary imaging device for wheels comprising a housing matched with the wheels, and a processing component, a display component and a power supply that are installed in the housing, the processing component being electrically connected with the display component and the processing component and the display component being both electrically connected with the power supply, and wherein the processing component is configured to send received or read to-be-displayed content to the display component after a preset processing, the preset processing comprising adjusting the number of frames displayed according to a vehicle speed; and the display component is configured to display the to-be-displayed content sent by the processing component, wherein the automobile further comprises a brightness detection device electrically connected with the rotary imaging device, so that the rotary imaging device is able to determine whether to work according to a brightness of light, and to adjust brightness and contrast displayed according to the brightness of the light.

2. The automobile according to claim 1, wherein the housing comprises an inner housing of which an inner side is fixed to spokes of the wheels, and an accommodating cavity for placing the processing component and the display component is arranged in a middle of the inner housing.

3. The automobile according to claim 2, wherein the rotary imaging device for wheels further comprises an outer cover plate covering the inner housing, and a part, corresponding to the accommodating cavity, of the outer cover plate is where a preset material or a preset structure of the display component is configured to be seen.

4. The automobile according to claim 3, wherein the power supply is a rechargeable storage battery.

5. The automobile according to claim 3, wherein the power supply is a generator that generates power when the wheels rotate.

6. The automobile according to claim 3, wherein the power supply comprises a rechargeable storage battery and a generator, an input end of the rechargeable storage battery is connected with the generator, and an output end of the rechargeable storage battery is connected with the processing component and the display component.

7. The automobile according to claim 3, wherein the power supply comprises a generator, a rechargeable storage battery and a power management component, an output end of the generator and an output end of the rechargeable storage battery being both connected with the processing component and the display component, and wherein, when the generator is working, the power management component controls the output end of the generator to output power; otherwise, the power management component controls the output end of the rechargeable storage battery to output power.

8. The automobile according to claim 1, further comprising a vehicle speed detection device electrically connected with the rotary imaging device.

\* \* \* \* \*